United States Patent
Hiranuma et al.

(10) Patent No.: US 9,745,646 B2
(45) Date of Patent: Aug. 29, 2017

(54) ELECTRIC AIR FLOW CONTROL DEVICE FOR INTERNAL COMBUSTION ENGINES

(71) Applicant: Hitachi Automotive Systems, Ltd., Hitachinaka-shi, Ibaraki (JP)

(72) Inventors: Daisuke Hiranuma, Hitachinaka (JP); Masahiro Mokuo, Hitachinaka (JP); Kazuo Ojima, Hitachinaka (JP); Noboru Baba, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 7 days.

(21) Appl. No.: 14/913,529

(22) PCT Filed: May 26, 2014

(86) PCT No.: PCT/JP2014/063767
§ 371 (c)(1),
(2) Date: Feb. 22, 2016

(87) PCT Pub. No.: WO2015/025576
PCT Pub. Date: Feb. 26, 2015

(65) Prior Publication Data
US 2016/0201578 A1    Jul. 14, 2016

(30) Foreign Application Priority Data

Aug. 20, 2013  (JP) .................. 2013-170052

(51) Int. Cl.
*F02D 9/10*      (2006.01)
*F16C 33/12*     (2006.01)
(Continued)

(52) U.S. Cl.
CPC ............... *C22C 9/02* (2013.01); *F02D 9/106* (2013.01); *F02D 11/10* (2013.01); *F16C 33/128* (2013.01);
(Continued)

(58) Field of Classification Search
CPC ........... F02D 19/1095; F02D 19/1065; F02D 19/106; F02D 19/10; F02D 19/107;
(Continued)

(56) References Cited

U.S. PATENT DOCUMENTS 4,638,538 A  *  1/1987  Kohama ............... B21D 22/08
                                                 29/898.054
5,675,201 A     10/1997  Komura et al.
(Continued)

FOREIGN PATENT DOCUMENTS

EP       1 281 838 A2    2/2003
JP       5-202923 A      8/1993
(Continued)

OTHER PUBLICATIONS

International Search Report (PCT/ISA/210) issued in PCT Application No. PCT/JP2014/063767 dated Sep. 2, 2014, with English translation (four (4) pages).
(Continued)

*Primary Examiner* — Lindsay Low
*Assistant Examiner* — George Jin
(74) *Attorney, Agent, or Firm* — Crowell & Moring LLP

(57) ABSTRACT

The purpose of this invention is to achieve an electric air flow control device comprising a motor rotor bearing structure having excellent wear resistance even with loads from striking caused by a high vibrational environment specific to an internal combustion engine. A cylindrical sintered metal slide bearing is used in at least one of a front bearing (16) and a rear bearing (17) that support a rotor shaft (14) of a motor (3) that is the rotary control drive source of a throttle valve (7) that controls the intake air flow to an internal combustion engine, and the bearing design is such that the relationship of the radial crushing strength and the compressive deformation rate of the cylindrical sintered metal bearing has the mechanical properties of a maximum radial crushing strength of 230 N/mm2 or greater and a maximum
(Continued)

compressive deformation rate of 3.5% or greater at the maximum radial crushing strength.

2 Claims, 4 Drawing Sheets

(51) Int. Cl.
| | | |
|---|---|---|
| *C22C 9/02* | (2006.01) | |
| *F16K 1/22* | (2006.01) | |
| *H02K 5/167* | (2006.01) | |
| *F02D 11/10* | (2006.01) | |

(52) U.S. Cl.
CPC ............ *F16K 1/221* (2013.01); *H02K 5/1672* (2013.01); *F02D 2011/101* (2013.01); *F16C 2204/12* (2013.01)

(58) Field of Classification Search
CPC ........... F02D 19/1075; F02D 2011/101; F02D 2011/102; F02D 11/10; B21D 53/10; F16C 33/145; F16C 33/14; F16C 33/12; F16C 33/128; F16C 2204/12; F02C 2220/20; C22C 9/02
See application file for complete search history.

(56) References Cited

U.S. PATENT DOCUMENTS

| | | | |
|---|---|---|---|
| 2008/0168965 A1* | 7/2008 | Shimura | F02D 9/101 123/337 |
| 2011/0283970 A1* | 11/2011 | Shimada | F02D 9/1065 123/337 |
| 2012/0177528 A1* | 7/2012 | Takayama | B22F 3/10 419/38 |
| 2013/0223774 A1* | 8/2013 | Ishii | B22F 5/106 384/279 |
| 2014/0311464 A1* | 10/2014 | Sano | F02M 26/53 123/568.11 |
| 2016/0301279 A1* | 10/2016 | Ito | B06B 1/16 |
| 2016/0341251 A1* | 11/2016 | Yoshizuka | F16C 33/128 |

FOREIGN PATENT DOCUMENTS

| | | |
|---|---|---|
| JP | 11-256206 A | 9/1999 |
| JP | 2001-107162 A | 4/2001 |
| JP | 2004-153914 A | 5/2004 |
| JP | 2006-22896 A | 1/2006 |
| JP | 4749260 B2 | 8/2011 |

OTHER PUBLICATIONS

NTN oil retaining bearing hand book: CAT. No. 9015-II/J (sixty-six (66) pages).

Catalog of sintered alloy Nickalloy material specification: Hitachi Powdered Metals Co., Ltd. Aug. 2005 version (seven (7) pages).

Extended European Search Report issued in counterpart European Application No. EP 14838075.1 dated Mar. 17, 2017 (six (6) pages).

\* cited by examiner

ELECTRIC AIR FLOW CONTROL DEVICE FOR INTERNAL COMBUSTION ENGINES

TECHNICAL FIELD

The present invention relates to an electric air flow control device provided at an intake air passage of an internal combustion engine for controlling appropriately the quantity of intake air to be supplied to the internal combustion engine.

BACKGROUND ART

With regard to the running controls of automobiles, electronic control of various components is widely used. Regarding the intake air quantity to be supplied to an internal combustion engine, an electric air flow control device controlling by using optimized electric signals after each driving condition is converted into electric signals tends to be standardized, instead of a mechanical air flow control device which controls mechanically by being linked to a connecting structure such as a wire for transmitting the pushing amount on the accelerator by a driver.

In recent years, the emission control as an environmental measure has become stricter and more complicated, and electric control tends to be often used even for diesel type internal combustion engines, which controlled little the exact intake air flow conventionally.

The electric air flow control device has a motor or the like for controlling the rotation of a combined gear mechanism with a required gear ratio, connected with a shaft end of an air flow control valve (throttle valve) receiving reaction force of a spring. As the feature of the air flow control valve, a butterfly valve structure for open and close control in a round-shaped passage is common and it carries out repetitive open and close control with a maximum rotary motion angle of approximately 90 degrees.

Even when the throttle valve for controlling an air flow receives the open and close control from the position corresponding to the fully closed passage to the fully open passage state, the number of revolutions of the motor for driving is usually about four, because the angle of rotary motion of the throttle valve is about 90 degrees, and thus the motor has no opportunity of continuous high speed rotation like common motors.

In view of a continuous constant driving state on the expressways or the like, the driving motor only receives control for a slight forward-reverse rotation close to the standstill state, though a slight open and close control of the throttle valve is conducted in response to the accelerator operation. (Although the motor is required to issue a balancing force to maintain the throttle valve opening to secure the targeted driving state, it has almost no chance of a continuous rotating movement compared with motors for the general industrial equipment.)

When the load environment of the motor that is mounted on an internal combustion engine and is a drive source of the electric air flow control device is considered, it is understood that an environment of vibration transmitted from the internal combustion engine, from the road surface or the like exists as well as rotating speed of the motor itself and a low and high temperature environment in view of the state from being left in a cold district to the continuous driving. In the vicinity of both ends of the motor rotor shaft, a rolling bearing represented by a ball bearing or a needle bearing, or a cylindrical slide bearing structure is provided for maintaining a stable movement of the motor rotor.

When the operating conditions of vehicle motors are divided into two groups, one has a specification of a continuous high-speed operation for driving components such as cooling water circulation pumps, cooling fans and air conditioner fans and the other has an operation specification for controlling each related equipment (for example, for an electric brake control and an electric air flow control device) having almost no continuous rotation.

In the latter case, the positional relationship between the motor rotating shaft and the bearing changes in only an extremely limited narrow range and in the case of use of a rolling bearing such as a ball or needle bearing, the rotation of balls or needs themselves is not expected, and the rolling members and the track surfaces of the inner and outer rings have point contact or line contact at almost the fixed positions. When a high vibrational load environment specific to the internal combustion engine (vehicle) is applied, a high stress (surface pressure) occurs at the microscopic contacting portion between the rolling member and the inner and outer ring track surfaces, resulting in malfunctioning damage on the rolling members or the tracks.

For motors with a long service life designed in view of the peculiarity of the motor operation state having almost no continuation of the high speed rotation and the severe vehicle vibrational environment, cylindrical slide bearings of the copper alloy system are often employed in consideration of the materials of the rotating shaft (generally iron-based materials). In particular, productivity and lubricating ability of the bearing members are considered and most of them have designed structures in which copper-alloy-based sintered metals are impregnated with lubricating oil. High reliability for supporting the rotation stably in a long term is demanded from such sintered of retaining bearings and various proposals regarding the metal matrix of copper alloy as a base material and lubricating oil for impregnation are made (NPLS 1 to 3 and PTL 1).

NPL 1. proposes each kind of a Cu—Sn system, Cu—Sn—C system, Cu—Sn—Ni system, Cu—Sn—C—P system and Cu—Sn—MoS2 system as materials for sintered oil retaining bearings. NFL 2 highlights a Cu—Sn—MoS2-based material HZ18 for a bearing for an electronic control throttle and by adding solid lubricating performance by addition of molybdenum disulfide and by adopting a fluorine system as a lubricating oil for impregnation and a PTFE as a thickener for the lubricating oil, a bearing with a high quietness and wear resistance can be provided even at a high temperature environment of 150° C. A comparison of the wear amount property is disclosed as a comparison with conventional materials in an abrasion test at a rotating speed of 3000 r/min, with a radial load of 9.8 N, and at an ambient temperature of 160° C. as the evaluation conditions to show that the wear amount after approximately 450 hours reduces to ⅓ of that of the conventional material.

NPL 3 proposes a Cu—Sn system, Cu—Sn—C system, Cu—Sn—Ni—C system and others as copper-alloy-based bearing materials, and PTL 1 introduces, as a specific proposal for the purpose of enhancement of the mechanical property of the copper-alloy-based sintered base material and the lubricating performance of impregnating oil, a material configured such that the metal matrix contains 2-6% by mass of Ni, 7-13% by mass of Sn, and Cu and foreign matters as the remainder, and perfluoropolyether as lubricating oil is used for impregnation in holes of a porous sintered body in which a Ni—Sn—Cu alloy phase of 20-100 μm is dispersed in a Cu—Sn alloy base, in order to achieve an excellent slide property.

CITATION LIST

Patent Literature

PTL 1: Japanese Patent. No. 4749260

Non-Patent Literature

NPL 1: NTN oil retaining bearing hand book: CAT. No 9015-II/J
NPL 2: NTN Tokusyugoukin kabushikigaisya Homepage information: Product introduction "Bearing for electronic control throttle"
NPL 3: Catalog of sintered alloy Nickalloy material specification: Hitachi Powdered Metals Co., Ltd. August 2005 version

SUMMARY OF INVENTION

Technical Problem

It is well known that motors for vehicles particularly motors for an electric air flow control device mounted near internal combustion engines are commonly subjected to application of a high vibrational load specific to the internal combustion engine as well as a severe temperature environment, and further the vibrational environment of a diesel type internal combustion engine is severer than that of a gasoline type internal combustion engine. To maintain a stable rotation of the motor, the design of high reliability bearing structure is indispensable and a seizure resistance and a wear resistance are important as performance demanded from the shaft and the bearing. As NPLS 1 and 2 and PTL 1 propose, the design of a copper-alloy-based material for a general iron-based shaft material and the design of lubricating oil for impregnation are often used for the seizure resistance.

On the other hand, with regard to the wear resistance, important are resistance to rotational slide wear depending on the relatively static bearing load and a lubrication performance and resistance to striking wear caused by a relative motion between the shaft and the bearing, caused by a dynamic load environment such as a vibration.

The wear amount property disclosed in NPL 2 and the comparison of wear amount described in PTL 1 are evaluations of a general rotational slide wear, which compare a wear size, a wear volume, a wear weight or the like after a shaft that is rotating at a required constant speed is pressed against a bearing inner circumferential, surface with a required radial load for a required time.

The motor rotor for an electric air flow control device is required to have a balancing motion corresponding to a rotary torque of the spring member applied to the air flow control valve shaft and load fluctuation such as fluid force applied to the air flow control valve, and as fluctuation of a relatively static load, the motion is transmitted to the bearing through rotor shaft. Further, a proof strength design corresponding to a high vibrational environment particular to an internal combustion engine is necessary, and in view of the bearing supporting the rotor shaft, enhancement of the wear resistance against the striking phenomenon between the rotor shaft and the bearing caused by a high vibrational environment is important because enhancement of proof strength against only a general rotational slide wear property (proof strength against a static radial load) is not enough.

An object of the present invention is to provide an electric air flow control device provided with a motor that can endure the striking phenomenon caused by vibrational acceleration levels of 245 m/s$^2$ of a gasoline type internal combustion engine and of 343 m/s$^2$ of a diesel type internal combustion engine, which are generally required values of a vibrational environment.

Solution to Problem

An object of the present invention is to stipulate an index value of ductility by focusing on brittleness of the material as well as material strength as mechanical properties of the bearing material in order to suppress wear from a relative striking phenomenon between the motor rotor shaft and the cylindrical slide bearing, caused in the microscopic clearance between the both members.

With regard to a cylindrical product made of a sintered metal or others, the radial crushing strength is commonly compared for evaluating actual body strength. On the other hand, as an index value for evaluating metal ductility, an elongation percentage, an impact value or the like is used but the substitution of the compressive deformation rate defined by the following equation as the index of ductility, which can be understood at the time of the evaluation of the radial crushing strength of a cylindrical actual body is effective.

$$\text{Compressive deformation rate} = \frac{\text{Deformation amount}}{\text{Initial outer diameter dimension}} \times 100\ (\%)$$

The present invention is characterized by the stipulation made such that the radial crushing strength and the compressive deformation rate (particularly, the deformation rate till crack occurrence) of a cylindrical sintered metal bearing employed as a bearing for a motor rotor shaft for an, electric air flow control device are required values or more respectively in their relationship.

ADVANTAGEOUS EFFECTS OF INVENTION

The electric air flow control device according to the present invention adopts a suitable material having high radial crushing strength and a high compressive deformation rate despite a copper-alloy-based material, for the cylindrical slide bearing for supporting the rotor shaft of the motor, which is a rotary drive source of a throttle valve arranged in the intake air passage and directly controlling the intake air quantity, and the device can maintain a high reliability bearing structure that can endure sufficiently striking wear caused from a vibrational environment of an internal combustion engine and others as well as common rotational slide wear.

DESCRIPTION OF EMBODIMENTS

Figure 1:
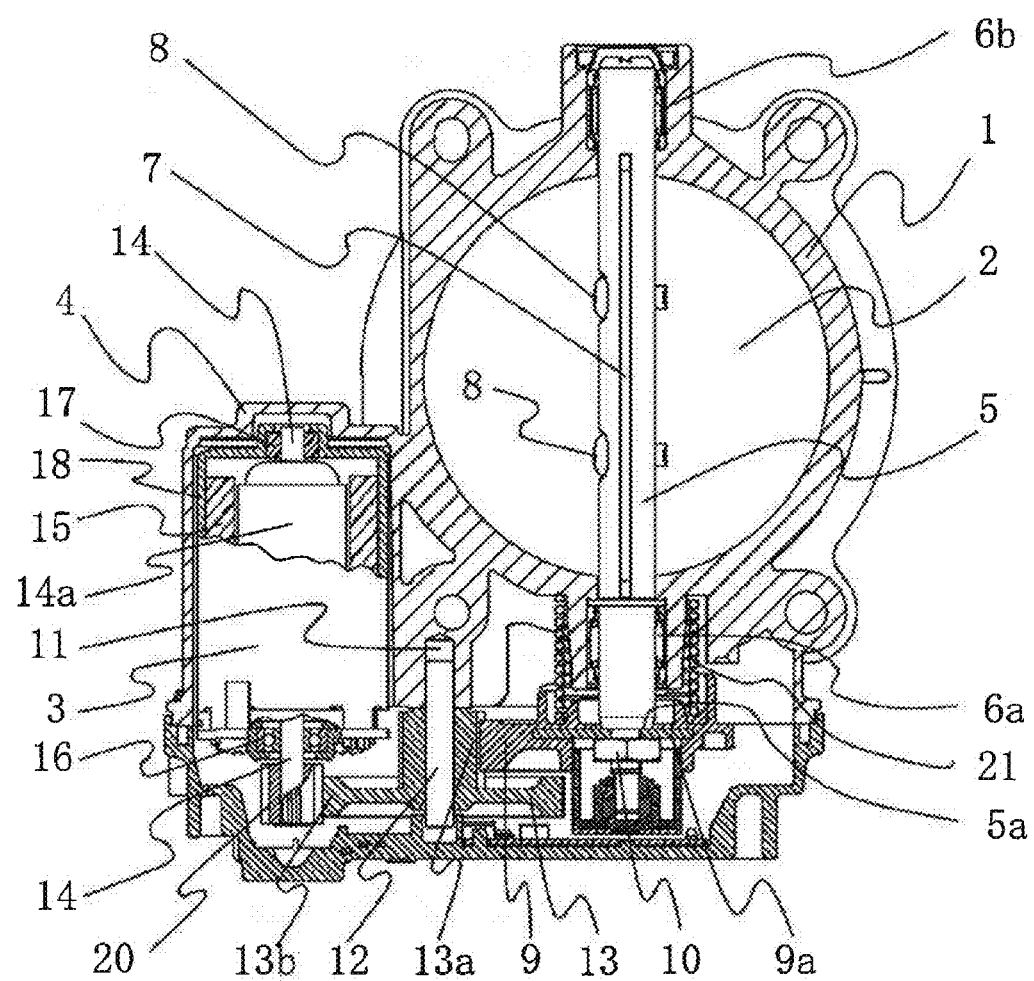
FIG. 1 is a cross-section structural view of an electric air flow control device showing an embodiment of the present invention.
Figure 2:
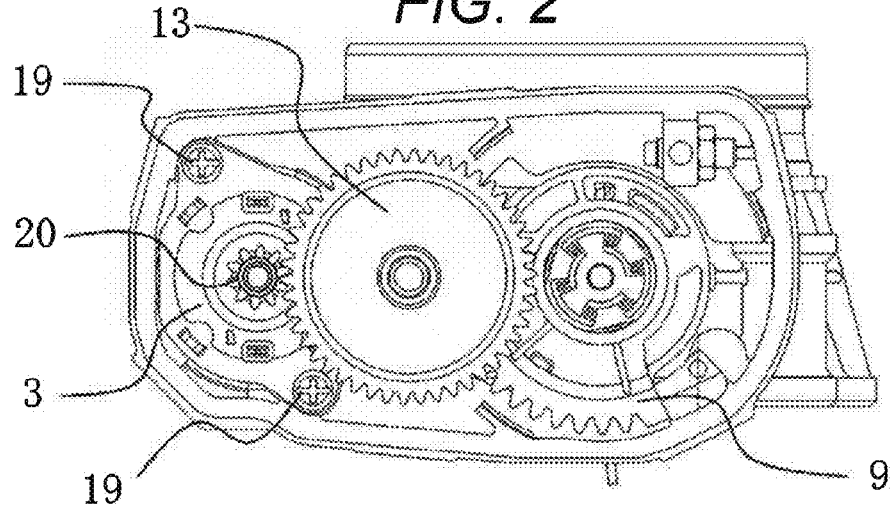
FIG. 2 is an exploded side view illustrating the engagement of gear members between a motor and a throttle valve shaft

FIG. 1 is an overall cross-sectional view illustrating an embodiment of an electric air flow control device according to the present invention and FIG. 2 is an exploded side view viewed from the gear side of the various types of drive gear.

In general, a body 1 that is often made of die-cast aluminum is integrally molded with an intake air passage 2 and a motor housing 4 for storing a motor 3.

In the intake air passage 2 of the body 1, a throttle valve shaft 5 extending across the passage is arranged and supported by bearing structures 6a and 6b for keeping a stable rotary motion of the throttle valve shaft 5 (in the present embodiment, though needle-structured rolling bearings are shown, they may be ball-structured rolling bearings or simple cylindrical shaped slide bearings). Further, on the part of the throttle valve shaft 5 corresponding to the intake air passage 2, a throttle valve 7 for controlling to optimize the quantity of intake air to be sent to the internal combustion engine is integrated by fastening screws 8.

An integrally molded metal, plate 9a of a throttle valve gear 9 is integrated with a step section 5a of the throttle valve shaft 5 with nuts 10. The throttle valve gear 9 is engaged with a small-diameter gear section 13a of an intermediate gear 13 arranged so as to be rotatable relative to an intermediate shaft 12 fixed into a hole 11 of the body 1 by press fitting.

The motor 3 as a drive source for controlling the open and close motion of the throttle valve 7 is composed of a rotor 14a integrated with a rotor shaft 14, a magnet 15, a front bearing 16 and a rear bearing 17 for supporting the rotor shaft 14 stably, a case member 18 supporting and fixing various components and other members, and the motor 3 is fixed and housed in the motor housing 4 by fastening motor fixing screws 19.

A small-diameter driving gear 20 is integrated with an end of the rotor shaft 14 of the motor 3 and engaged with a large-diameter gear section 13b of the intermediate gear 13.

The rotary motion of the motor 3 controlled as needed is transmitted through a double reduction gear mechanism constituted by engagement of the drive gear 20 and the large-diameter gear section 13b of the intermediate gear 13 and engagement of the small-diameter gear section 13a of the intermediate gear 13 and the throttle valve gear 9, and the rotary motion results in the open and close motion of the intake air passage 2 of the throttle valve 7 finally.

In a space between the rear surface of the throttle valve gear 9 and the body 1, a torsion spring 21 is fixed by being sandwiched and respective ends of the torsion spring 21 are engaged with the body 1 and the throttle valve gear 9, and the throttle valve shaft 5 is preloaded in the rotating direction relative to the body 1.

An air flow control device is usually integrated with an intake pipe at the aggregation part of intake pipes diverging into respective cylinders of the internal combustion engine and is subjected to a high temperature and a high vibration specific to internal combustion engines; however the motor can be subjected to a severer vibrational environment than the body 1 fixed directly to the intake pipe in consideration of the usual overhung fixing structure of the motor 1 for the open and close control drive of the throttle valve 7, fixed and housed in the motor housing 4.

In the embodiment in FIG. 1, as bearings supporting the rotor shaft 14 of the motor 3, a rolling bearing constituted by inner and outer rings and steel balls is shown as a front bearing 16 and a simple cylindrical slide bearing is shown as a rear bearing 17; however, even if both are slide bearing structures, no problem occurs with the structure of the product.

The loads that these bearings receive are roughly divided into a general rotational sliding load from the rotor shaft 14 of the motor 3 and a collision (striking) load from the rotor shaft 14, caused from transmission of vibrational environment which the air flow control device receives from the internal combustion engine.

In order to ensure high reliability of the motor 3 as a drive source of the throttle valve 7 controlling directly the air flow, enhancement of proof strength of the bearing structure supporting the rotor shaft 14 of the motor 3 is an important point, and improvement of the wear resistance of the simple cylindrical slide bearing shown as the rear bearing 17 in the embodiment in FIG. 1 is important. In particular, a wear resistance enhancement design against the striking load caused from a vibrational environment of the internal combustion engine decides the quality of the products.

With regard to a slide bearing made of a sintered metal, even if the strength of the base material of the sintered metal is the same, impregnation design, which is a feature of sintered metal, namely, an optimization design of the type of oil for impregnation into holes can improve the lubrication performance, and thus, the enhancement of wear resistance can be achieved (refer to FIG. 3) in a general rotational sliding load environment. However, the effects of impregnating oil design for enhancing the resistance to striking wear caused by a collision load are close to nothing, and thus, the enhancement of the strength of base material of the sintered metal itself is essential.

Further, as a feature of damage forms resulting from a striking phenomenon caused by a collision load, there is a problem of chip occurrence in the neighborhood of the corner part of both end surfaces of the bearing inner circumferential surface as well as simple wear on the bearing inner circumferential surface, and with regard to the design of the base material of sintered metal itself, improvement of ductility (toughness) that is an index of brittleness of the design material is an extremely important design factor as well as improvement of the breaking strength (radial crushing strength).

As evaluation example of various properties of the materials of the bearing (cylindrical rear bearing 17 made of sintered metal) for the rotor shaft 14 of the motor 3 described above employed according to the present invention and conventional bearing materials, the comparison of wear resistance of the designed component materials shown in Table 1 will be described.

TABLE 1

| ALLOY MATERIAL | CHEMICAL COMPONENT % (CATALOG VALUE) | | | | |
|---|---|---|---|---|---|
| | Cu | Sn | Ni | C | MoS2 |
| Cu—Sn SYSTEM | REMAINDER | 8-11 | — | — | 4-7 |
| Cu—Sn—Ni SYSTEM | REMAINDER | 9-12 | 2-4 | 1-3 | — |

Figure 3:
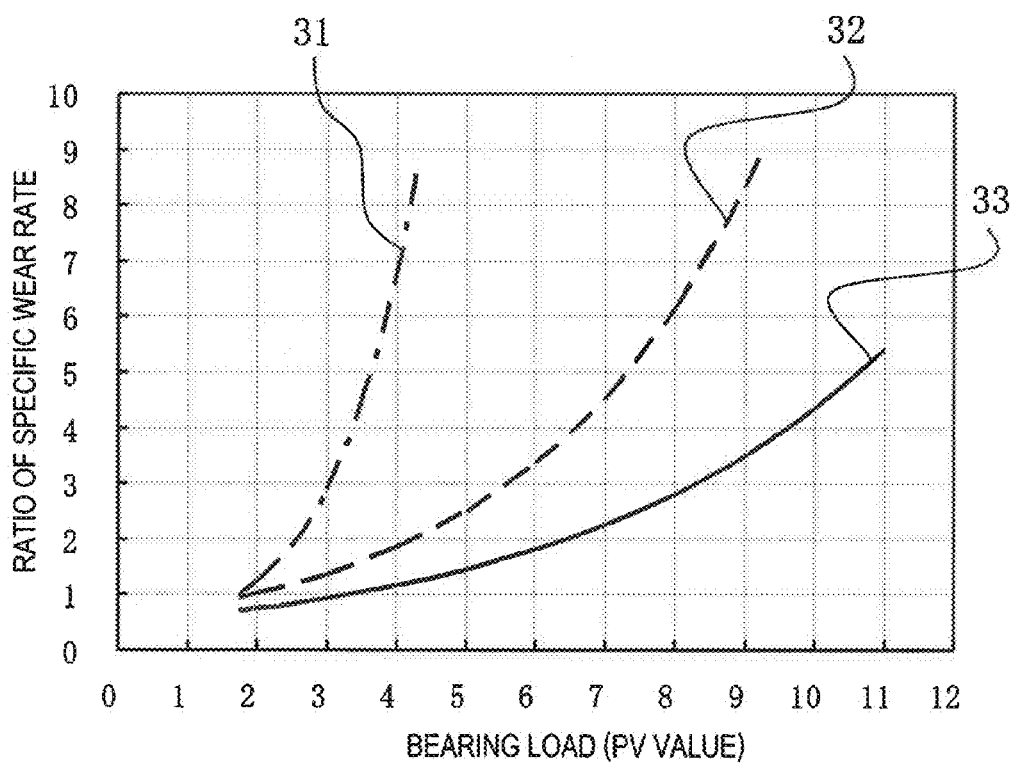
FIG. 3 is a characteristic diagram comparison of a specific wear rate property for each bearing material specification in the evaluation of the rotational slide wear with static bearing load application.

FIG. 3 shows the relationship between the bearing load and the ratio (ratio indicated on the assumption that the specific wear rate at the time of the minimum bearing load evaluation of the Cu—Sn-based material shown as the specific wear rate property 31 is 1.0) of the specific wear rate (wear volume during a unit distance slide) as an example of wear property evaluation of a common rotational slide of two materials of a Cu—Sn system and a Cu—Sn—Ni system. The Cu—Sn—Ni-based specific wear rate property 32 for which he optimization of alloy components has been considered and is shown by a broken line can achieve an excellent property that restrains the wear amount up to the high PV value level compared with the Cu—Sn-based specific wear rate property 31 shown by an alternate long and short dash line. Further, depending on the optimization of lubricating oil for impregnation into holes particular to a sintered metal, the specific wear rate property 23 which is more excellent despite the same designed alloy material and is shown by a continuous line also can be achieved.

In Table 2, as a maximum bearing load environment of a bearing on an optional internal combustion engine, the ratios of specific wear rate are compared at a PV value of 4.0 in FIG. 3. The wear amount of a Cu—Sn—Ni-based material can reduce to approximately 27% of the wear amount of a Cu—Sn-based material, and further, a Cu—Sn—Ni-based material to which the optimization of impregnating oil is applied can reduce to approximately 17%.

TABLE 2

| ALLOY MATERIAL | IMPREGNATING OIL TYPE | RATIO OF SPECIFIC WEAR RATE AT ASSUMED MAXIMUM BEARING LOAD (PV INDEX VALUE = 4) | COM-PAR-ISON |
|---|---|---|---|
| Cu—Sn SYSTEM | FLUORINE SYSTEM (VISCOSITY INDEX: LOW) | 6.70 | 1.00 |
| Cu—Sn—Ni SYSTEM | FLUORINE SYSTEM (VISCOSITY INDEX: LOW) | 1.83 | 0.27 |
| | FLUORINE SYSTEM (VISCOSITY INDEX: HIGH) | 1.17 | 0.17 |

Next, as the limit of bearing wear amount required based on the guaranteed life of the bearing on the vehicle, the PV values that are bearing loads when the ratio of the specific wear rate reaches 3.0 in FIG. 3 are compared in Table 3.

The Cu—Sn—Ni-based material can endure a bearing load 1.85 times greater than the load that the Cu—Sn-based material can endure, and further the Cu—Sn—Ni-based material with the impregnating of optimized can endure a high bearing load 2.72 times greater than the load.

TABLE 3

| ALLOY MATERIAL | IMPREGNATING OIL TYPE | BEARING LOAD AT ASSUMED LIMIT OF BEARING WEAR AMOUNT (RATIO OF SPECIFIC WEAR RATE = 3) | COM-PAR-ISON |
|---|---|---|---|
| Cu—Sn SYSTEM | FLUORINE SYSTEM (VISCOSITY INDEX: LOW) | 3.05 | 1.00 |
| Cu—Sn—Ni SYSTEM | FLUORINE SYSTEM (VISCOSITY INDEX: LOW) | 5.63 | 1.85 |
| | FLUORINE SYSTEM (VISCOSITY INDEX: HIGH) | 8.30 | 2.72 |

The properties shown in FIG. 3, and Tables 2 and 3 described above are the comparison of specific wear rate obtained by the rotational slide evaluation under a static pressure load environment. Fluctuating loads caused by vibrations of internal combustion engines themselves or the like are applied to many products mounted on the internal combustion engines, including an electric air flow control device according to the present invention. That is, impulsive striking loads caused by vibrations during a rotational slide movement are applied and thus enhancement of proof strength under a complex environment in consideration of the striking load is important, as well as wear resistance against a general rotational slide.

Table 4 shows the comparison of wear amount on the bearing inner circumferential surface obtained by the forward-reverse rotational slide evaluation under the vibrational environment of the actual machine. The vibration condition is in accordance with an optional specification proposed by a customer. This endurance specification, in view of the parts sharing, includes specification environments of both of the gasoline engine and the diesel engine, and the sine wave excitation and the random wave excitation of the combined evaluation of a vibration acceleration close to the actual driving condition are compared.

TABLE 4

| ALLOY MATERIAL | VIBRATION CONDITION | EVALUATION TIME h | INNER DIAMETER WEAR AMOUNT μm | REMARKS |
|---|---|---|---|---|
| Cu—Sn SYSTEM | SINE WAVE EXCITATION | 600 | 573 | APPROX. 41 TIMES WEAR |
| | RANDOM WAVE EXCITATION | 1360 | 1873 | APPROX. 99 TIMES WEAR |

TABLE 4-continued

| ALLOY MATERIAL | VIBRATION CONDITION | EVALUATION TIME h | INNER DIAMETER WEAR AMOUNT μm | REMARKS |
|---|---|---|---|---|
| Cu—Sn—Ni SYSTEM | SINE WAVE EXCITATION | 600 | 14 | — |
| | RANDOM WAVE EXCITATION | 1360 | 19 | — |

As a wear amount of the bearing inner diameter, the dimensional change of the inner diameter relative to the initial situation is shown, and in both cases of the sine wave and the random wave, the Cu—Sn-based material exhibits a wear amount which is approximately 41-99 times greater than that of the Cu—Sn—Ni-based material.

Figure 4:
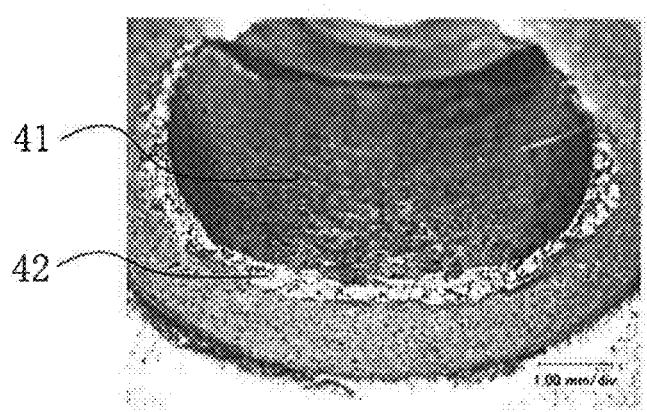
FIG. 4 is an explanatory photographic image showing an example of a damage state after the evaluation of a Cu—Sn-based bearing material in the evaluation of rotational slide wear with dynamic bearing load application.
Figure 5:
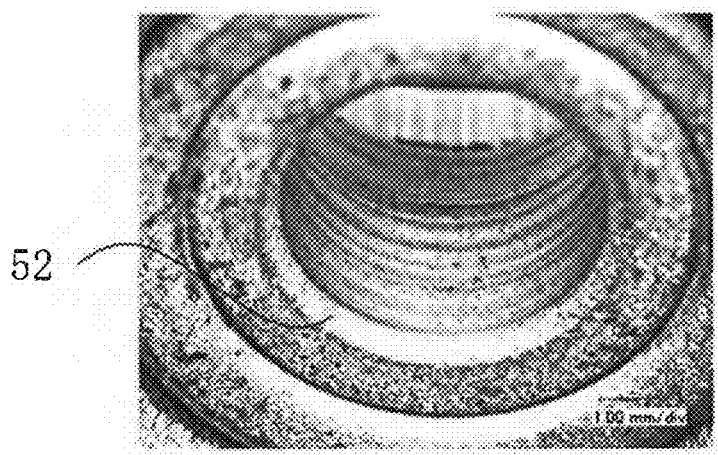
FIG. 5 is an explanatory photographic image showing an example of a damage state after the evaluation of a Cu—Sn—Ni-based bearing material in the evaluation of rotational slide wear with dynamic bearing load application.

Enlarged photographic images of the vicinity of the inner circumferential part facing the rotating shaft after the completion of the evaluation for a Cu—Sn-based material is shown in FIG. 4 and for a Cu—Sn—Ni-based material in FIG. 5. What should be noted is the chips seen on nearly entire circumference of an inner diameter corner part 42 as well as dimensional enlargement of an inner diameter part 41 of the Cu—Sn-based material shown in FIG. 4. There is no chip occurrence on a corner part 52 of the inner diameter of the Cu—Sn—Ni-based material shown in FIG. 5, and thus it can be said that the Cu—Sn-based material is apparently inferior in ductility and exhibits brittleness (fragility) compared with the Cu—Sn—Ni-based material having an excellent striking wear resistance.

Figure 6:
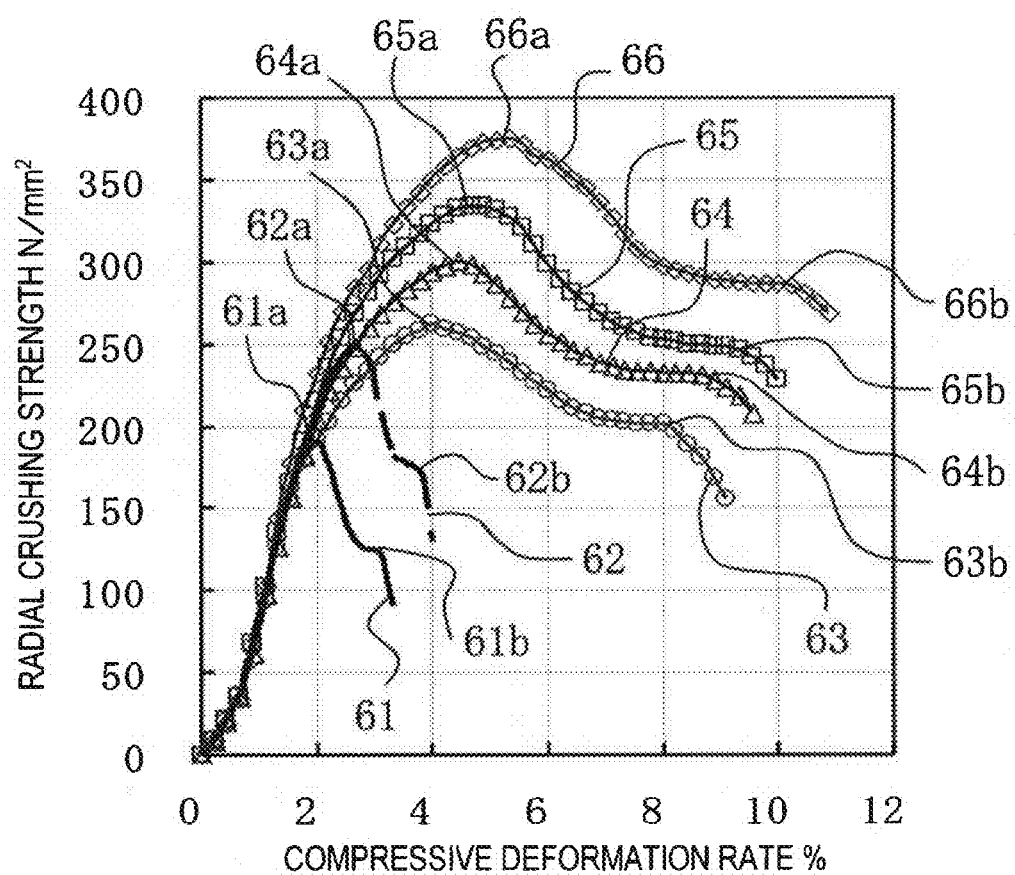
FIG. 6 is a characteristic diagram showing the property comparison between the radial crushing strength and the compressive deformation rate, obtained at the time of the compression evaluation of a cylindrical actual body bearing material.

For a cylindrical product made of sintered metal or the like, the radial crushing strength which is stipulated in Japanese Industrial Standards and is calculated according to the following equation is commonly used for comparison for the evaluation of actual body strength, and examples of the property evaluation of radial crushing strength of products in the same shape corresponding to various design materials are shown in FIG. 6.

$$\text{Radial crushing strength: } K = \frac{F(D-e)}{L \cdot e^2} (N/mm^2)$$

wherein F: Applied load in compression direction (N)
L: Length of hollow cylinder (mm)
D: Outer diameter of hollow cylinder (mm)
e: Wall pressure of hollow cylinder (mm)

The vertical axis indicates the radial crushing strength calculated based on a cylindrical compression load, and the horizontal axis indicates the compressive deformation rate during the compression load application as defined above.

In FIG. 6, the property examples 61 and 62 denote Cu—Sr-based materials and the property examples 63 to 66 denote Cu—Sn—Ni-based materials. Any property has a similar tendency to the general compression strength property of metals in which as the radial crushing strength (applied load in the compression direction) increases, the deformation amount in the compression direction increases.

Figure 7:
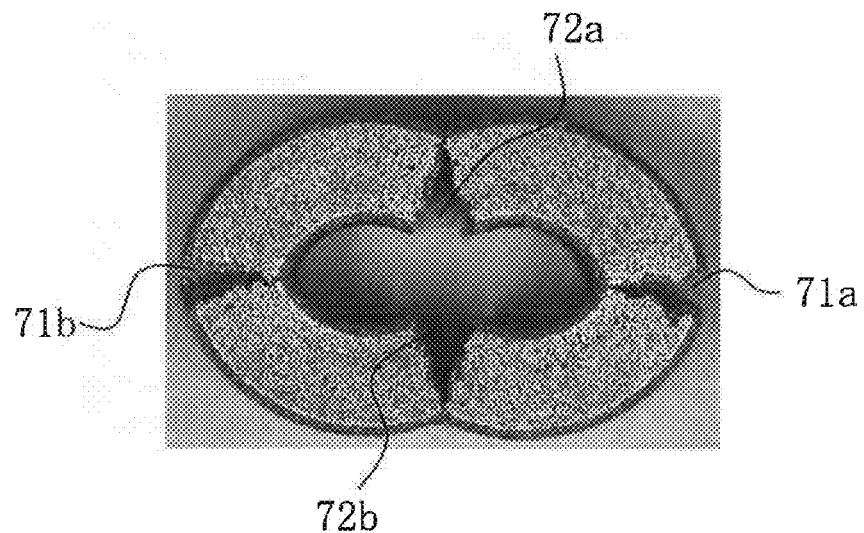
FIG. 7 is an explanatory photographic image showing a crack occurrence state seen at the time of the compression evaluation.
Figure 8:
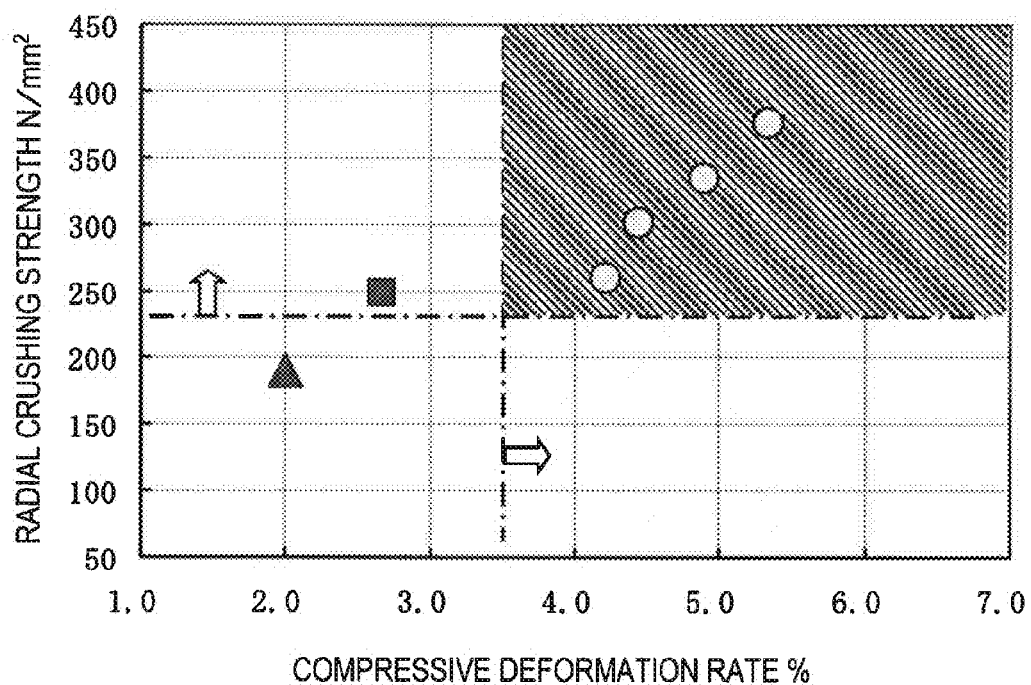
FIG. 8 is an explanatory view showing the superiority determination in a wear resistance evaluation of a cylindrical actual body bearing material on the matrix of the radial crushing strength and compressive deformation rate.

At the maximum values of radial crushing strength 61a to 66a of respective properties, cracks occur at the portions having the maximum tensile stress on the cylindrical outer circumferential horizontal parts and the property begins to decline. With further application of the load, the declination of the property becomes once smaller; however at the inflection points 61b to 66b of respective properties, cracks are added at the portions having the maximum tensile stress on the cylindrical inner circumferential vertical parts, and after this, the property exhibits a rapid declination. (An example of an actual body external appearance after the completion of radial crushing strength property evaluation is shown in FIG. 7 for reference. Signs 71a and 71b denote cracks that occurred when the maximum points of radial crushing strength 61a to 66a were reached, and signs 72a and 72b denote cracks that occurred when radial crushing strength points 61b to 66b were reached.)

When the maximum values of radial crushing strength 61a to 66a of respective property examples 61 to 66 is noticed, it is understood that the radial crushing strength of the vertical axis corresponds to a material strength index value for determining a general rotational slide wear property of a design material, and the compressive deformation rate of the horizontal axis corresponds to a ductility index value for determining proof strength against a striking load caused by dynamic load fluctuation such as a vibration.

The specimens in Table 4 (inner diameter wear amount comparison) FIGS. 4 and 5 (both are enlarged photographic images after the completion of the evaluation) shown as specific evaluation examples made in consideration of a dynamic striking load such as a vibration have the same specification as specimens of the property examples 61 and 63 shown in the radial crushing strength property in FIG. 6.

The material of the property example 63 exhibits excellent wear resistance and improvement of chip resistance without enlargement of the inner diameter or falling-off of the corner part. The property example 62 which has the same material system as the property example 61 and whose radial crushing strength is attempted to improve (the maximum value of radial crushing strength 62a is equivalent to the maximum value 63a of the property example 63) is also evaluated by taking into account a dynamic striking load such as a vibration similarly to the above-described manner but does riot exhibit an excellent wear resistance or enhancement of the chip resistance seen in the material of the property example 63.

By enhancing the radial crushing strength which is the material strength index value of a cylindrical member, proof strength can be enhanced against general rotational slide wear; however it is understood that a design for improving the compressive deformation rate as a ductility index of design material is more important for a striking phenomenon caused by a vibrational load environment such as an internal combustion engine, as well as enhancement of the radial crushing strength.

Although the property example 62 of the Cu—Sn-based material shown in FIG. 6 is designed to have the same component as the property example 61, the sintered density design value of the property example 61 is smaller than that of the property example 62. Further the property examples 64 to 66 of the Cu—Sn—Ni-based materials are also designed to have the same component as the property example 63 but the sintered density design value has the following relationship: property example 63<property example 64<property example 65<property example 66.

The resistance property to the wear of general rotational slide at the time of static load application to specimens of the property examples 61 to 66 of the radial crushing strength property in FIG. 6 and the striking wear resistance property at the time of dynamic load application under an exciting environment are arranged in Table 5 for each of the radial crushing strength and compressive deformation rate by using four kinds of judgment signs x, Δ, □ and o. FIG. 9 shows the relationship of the maximum values of radial crushing strength, the compressive deformation rates at the maximum radial crushing strength, and the overall judgment signs of each specimen shown in Table 5.

The materials with signs o denoting the judgment of adoptability exist in the area of the high radial crushing strength and high compressive deformation rate. On the other hand, the material with the sign Δ denoting the judgment of unadoptability because the resistance is insufficient to the wear of a general rotational slide with a static load and the resistance to striking wear from a dynamic load such as a vibration is also greatly inferior exists in the area of the low radial crushing strength and low compressive deformation rate.

Further, the material with the sign □ having a radial crushing strength equivalent to the lowest radial crushing strength of a material with the sign o denoting adoptability in the overall judgment and however having a small compressive deformation rate satisfies the resistance to the wear of a general rotational slide with a static load; however the employment of this material is not favorable because the resistance to striking wear from dynamic load such as a vibration shows a considerably inferior damage situation similarly to the material with the overall judgment sign Δ.

3 motor
4 motor housing
5 throttle salve shaft
6a, 6b bearing structure
7 throttle valve
8 screw
9 throttle valve gear
9a metal plate
10 nut
11 hole
12 intermediate shaft
13 intermediate gear
13a small-diameter gear section
13b large-diameter gear section
14 rotor shaft
14a rotor
15 magnet
16 front bearing
17 rear bearing
18 case member
19 motor fixing screw
20 drive gear
21 torsion spring
31-33 specific wear rate property
41 inner diameter part
42, 52 inner diameter corner part
61-66 example of radial crushing strength property
61a-66a maximum value of radial crushing strength
61b-66b inflection point of radial crushing strength
71a, 71b crack on outer circumferential part
72a, 72b crack on inner circumferential part

TABLE 5

| MAXIMUM RADIAL CRUSHING STRENGTH N/mm2 | COMPRESSIVE DEFORMATION RATE % | JUDGMENT OF ACTUAL BODY WEAR RESISTANCE | | OVERALL JUDGMENT |
|---|---|---|---|---|
| | | ROTATIONAL SLIDE WEAR (STATIC LOAD APPLICATION) | STRIKING WEAR (DYNAMIC LOAD APPLICATION) | |
| 191 | 2.0 | Δ (MEDIUM WEAR) | x (EXCESSIVE WEAR, LARGE CHIP) | Δ UNADOPTABLE |
| 249 | 2.7 | o (MILD WEAR) | x (EXCESSIVE WEAR, MEDIUM CHIP) | □ UNADOPTABLE |
| 259 | 4.2 | o (MILD WEAR) | o (MILD WEAR, NO CHIP) | o ADOPTABLE |
| 300 | 4.4 | o (MILD WEAR) | o (MILD WEAR, NO CHIP) | o ADOPTABLE |
| 334 | 4.9 | o (MILD WEAR) | o (MILD WEAR, NO CHIP) | o ADOPTABLE |
| 376 | 5.3 | o (MILD WEAR) | o (MILD WEAR, NO CHIP) | o ADOPTABLE |

Consequently, to achieve an electric air flow control device with high reliability, optimization of the radial crushing strength which is the index of base material strength and the compressive deformation rate which is the index of ductility is extremely important.

REFERENCE SIGNS LIST 1 body
2 intake air passage 71, 72 example of radial crushing strength property dependent on density

The invention claimed is:
1. An electric air flow control device for an internal combustion engine comprising:
a throttle valve mechanism for directly controlling quantity of intake air to be supplied to an internal combustion engine; and a motor configured to operate as a rotary control drive source for the throttle valve mechanism, the motor comprising:

a motor rotor shaft; and at least one bearing for supporting the motor rotor shaft, wherein the at least one bearing is a cylindrical shaped bearing made of a sintered metal and has a mechanical property of a maximum radial crushing strength of 230 N/mm$^2$ or more and a compressive deformation rate of 3.5% or more at a state corresponding to the maximum radial crushing strength in a relationship between the radial crushing strength and the compressive deformation rate obtained from a compression strength evaluation of an actual body of the at least one bearing.

2. The electric air flow control device for an internal combustion engine according to claim 1, wherein the bearing made of a sintered metal includes a copper alloy system containing at least Cu, Sn and Ni.

* * * * *